United States Patent Office 2,974,143
Patented Mar. 7, 1961

2,974,143
DIBENZO [de,g] QUINOLINE COMPOUNDS

Robert August Schmidt, Wallington, and Wilhelm Wenner, Upper Montclair, N.J., assignors to Hoffmann-La Roche Inc., Nutley, N.J., a corporation of New Jersey No Drawing. Filed Nov. 26, 1958, Ser. No. 776,396

9 Claims. (Cl. 260—286)

This invention relates to dibenzo[de,g]quinoline compounds and to salts thereof. More particularly, the invention relates to 6-methyl-1,2,3,3a,5,6,6a,7,11b,11c-decahydro-4H-dibenzo[de,g]quinoline compounds wherein there is a basic amine group in the 9-position and a hydroxy or alkoxy group in the 10-position. These compounds may be represented by the following structural formula

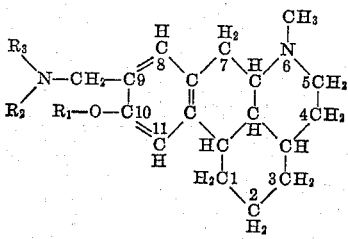

wherein $R_1$ represents hydrogen or lower alkyl, $R_2$ and $R_3$ each represents lower alkyl, phenyl lower alkyl or together with the attached nitrogen atom form a 5 to 6 membered saturated nitrogen monoheterocyclic.

The system of nomenclature and numbering of the ring system used above is that found in the standard reference, Patterson et al., The Ring Index (Reinhold Publishing Corp., New York) page 373, formula No. 2753 (1940).

In the above formula, the lower alkyl groups represented by $R_1$, $R_2$ and $R_3$ include for example, methyl, ethyl, propyl, isopropyl, butyl, amyl, isoamyl, hexyl, heptyl and the like. When $R_2$ or $R_3$ represents a phenyl lower alkyl group, lower alkyl groups such as those illustrated above with a phenyl group attached to the terminal carbon atom are intended. Instead of individual acyclic hydrocarbon groups, $R_2$ and $R_3$ may represent polymethylene or oxypolymethylene groups and form together with the attached nitrogen atom a saturated, 5 to 6 membered nitrogen monoheterocyclic such as piperidine, morpholine or pyrrolidine. Illustrative of the basic amine groups in the 9-position of the above structural formula are dimethylaminomethyl, diethylaminomethyl, dipropylaminomethyl, pyrrolidylmethyl, piperidylmethyl and morpholinylmethyl, dibenzylaminomethyl, etc. The groups represented by $R_2$ and $R_3$ need not be the same in a given compound but mixed groups such as N-methylbenzylaminomethyl, i.e. where $R_2$ represents methyl and $R_3$ represents benzyl, are also intended.

The compounds of the above formula, when $R_1$ represents hydrogen, are produced by reacting 6-methyl-10-hydroxy-1,2,3,3a,5,6,6a,7,11b,11c-decahydro-4H-dibenzo[de,g]quinoline with a secondary amine and formaldehyde according to the procedure of Mannich. The bases formed in this manner may be etherified, i.e. the 10-hydroxy group converted to an alkoxy group, by reacting the base with an alkylating agent such as phenyltrimethylammonium hydroxide.

The starting material, 6-methyl-10-hydroxy-1,2,3,3a,5, 6,6a,7,11b,11c-decahydro-4H-dibenzo[de,g]quinoline, from which the compounds of this invention are derived contains asymmetric carbon atoms and therefore exists in optically active forms as well as racemic mixtures thereof. The products derived from this starting material therefore also occur in optically active forms. The optically active forms, as well as racemic mixtures thereof, are within the scope of this invention.

The bases having the structural formula above, form acid addition salts and quaternary ammonium salts and these salts are also within the scope of the invention. Since the compounds have two nitrogen atoms in the molecule, they may form mono acid salts and mono quaternary salts as well as di-acid and di-quaternary salts.

Acid addition salts of compounds having the structural formula shown above may be produced by reacting the base with about one or two molar proportions of an inorganic or organic acid. Such salts as the mineral acid salts, e.g. hydrochloride, hydrobromide, hydroiodide, phosphate, nitrate, sulfate, etc., and organic salts such as acetate, tartrate, citrate, salicylate, ascorbate, arylsulfonates, e.g. benzenesulfonate, toluenesulfonate, etc., benzoate and the like may thus be formed.

Quaternary ammonium salts of the bases represented by the above structural formula may be produced by reacting the base with about one or two molar proportions of an alkylating agent such as alkyl halides, e.g. methyl bromide, methyl chloride, ethyl bromide, ethyl chloride, ethyl iodide, etc., aralkylating agents, e.g. benzyl chloride and the like.

The compounds of this invention are useful as vasodepressor agents, e.g. in treating hypertension. They may be administered orally or parenterally in the form of tablets, capsules, syrups, injectables and the like by incorporating therapeutic dosages of the base or a medicinally acceptable salt thereof along with carriers, excipients, lubricants, sterile water or the like, according to accepted practice.

The following examples are illustrative of the invention. All temperatures are stated in degrees centigrade.

Example 1

To 20 g. (0.169 mol) of a 38% solution of dimethylamine in alcohol and 25.7 g. (0.1 mol) of (+)-6-methyl-10-hydroxy-1,2,3,3a,5,6,6a,7,11b,11c-decahydro-4H-dibenzo[de,g]quinoline in about 250 cc. alcohol were added 9 g. (0.11 mol) of 37.4% formalin with mixing and cooling. The mixture stood for 1½ days and was then refluxed gently on the steam bath for about 8 hours. Evaporation of the solvent at diminished pressure left an oily residue which was dissolved in ether, washed twice with water, and dried over anhydrous sodium sulfate. The solution was then filtered. The ethereal filtrate, containing the base (+)-6-methyl-9-dimethylaminomethyl-10-hydroxy-1,2,3,3a,5,6,6a,7,11b,11c-decahydro - 4H - dibenzo[de,g]quinoline, was acidified with a 20% solution of hydrogen bromide in ethanol. The precipitated product, (+)-6 - methyl-9-dimethylaminomethyl-10-hydroxy-1,2,3,3a,5,6,6a,7,11b,11c - decahydro - 4H-dibenzo[de,g]-quinoline dihydrobromide, was recrystallized from 300 cc. of alcohol to obtain a colorless, crystalline powder, M.P. 195–200° (dec.). After the product was dried in vacuo over KOH flakes, the M.P. was 235–242° (dec.).

To 257 g. (1 mol) of (+)-6-methyl-10-hydroxy-1,2,3, 3a,5,6,6a,7,11b,11c - decahydro - 4H - dibenbo[de,g]quinoline, stirred in 2 liters of alcohol with ice-water cooling, were added 365 g. of 16.5% solution of dimethylamine in alcohol (59 g. or 1.3 mols of dimethylamine). 88 g. of 37.4% formalin were then added over a 10–15 minute period at 0–4°. The mixture was stirred for 4 hours, permitted to stand overnight, and heated slowly to reflux with stirring. A clear solution formed at about 50°. After refluxing for 6 hours, the solvent was evaporated at diminished pressure and the viscous residue dissolved in 0.5 liter of ether. The ether solution was washed twice with water, dried over anhydrous sodium sulfate, and evaporated. The residue, (+)-6-methyl-9-dimethylaminomethyl - 10 - hydroxy - 1,2,3,3a,5,6,6a,7,11b,11c-decahydro - 4H - dibenzo[de,g]quinoline, was taken up in 1250 cc. isopropanol and filtered.

The filtrate, containing the base was acidified with 4 N ethanolic-HCl. The solution was chilled, filtered and the residue was washed with cold isopropanol. The (+) - 6 - methyl - 9 - dimethylaminomethyl - 10 - hydroxy - 1,2,3,3a,5,6,6a,7,11b,11c - decahydro - 4H - dibenzo[de,g]quinoline dihydrochloride was recrystallized from 2100 cc. of ethanol and 225 cc. of methanol in the form of a colorless product. The M.P., taken rapidly, was 218° (dec.); taken slowly, 248–252° (dec. sintering at 213°). The melting point varies dependent on the conditions of drying and the rate of heating; $[\alpha]_D^{23}=+104.2°$ (1%, water).

An analytical sample, recrystallized from alcohol and washed first with alcohol and then ether, melted at 269–271° (dec.).

A solution of 4 g. of (+)-6-methyl-9-dimethylaminomethyl - 10 - hydroxy - 1,2,3,3a,5,6,6a,7,11b,11c - decahydro-4H-dibenzo[de,g]-quinoline in 50 cc. of methanol was mixed with 10 g. of methyl iodide. The solution was kept at room temperature for two days. The solvent was distilled off and the residue was recrystallized from methanol. The (+)-6-methyl-9-dimethylaminomethyl-10 - hydroxy - 1,2,3,3a,5,6,6a,7,11b,11c - decahydro - 4H-dibenzo[de,g]quinoline bis-methiodide melted at 288°.

*Example 2*

To 15 g. of a 19% solution of dimethylamine in alcohol (0.0632 mol of dimethylamine) and 11 g. (.0427 mol) of (−)-6-methyl-10-hydroxy-1,2,3,3a,5,6,6a,7,11b,11c-decahydro-4H-dibenzo[de,g]quinoline in 200 cc. of alcohol were added 5 g. (.0623 mol) of 37.4% formalin. The solution was permitted to stand overnight and was then refluxed gently for about 8 hours. Evaporation of the solvent at diminished pressure left the base, (−)-6-methyl - 9 - dimethylaminomethyl - 10 - hydroxy - 1,2,3,3a,5,6,6a,7,11b,11c - decahydro - 4H - dibenzo[de,g] quinoline, as a viscous residue, which was dissolved in ether, filtered, and the filtrate dried over anhydrous Na$_2$SO$_4$. Acidification of the ethereal filtrate with ethanolic-HBr precipitated a tan solid which was recrystallized from 125 cc. of alcohol. The (−)-6-methyl-9-dimethylaminomethyl - 10 - hydroxy - 1,2,3,3a,5,6,6a,7,11b,11c-decahydro - 4H - dibenzo[de,g]quinoline dihydrobromide crystallized as a colorless powder, M.P. 191.5–194° (dec.); $[\alpha]_D^{22}=-79.7°$ (3%, water).

*Example 3*

To 25.7 g. (0.1 mol) of (+)-6-methyl-10-hydroxy-1,2,3,3a,5,6,6a,7,11b,11c - decahydro - 4H - dibenzo[de,g]quinoline and 9.35 g. (0.11 mol) of piperidine in 200 cc. of alcohol were added 9 g. of 37.4% formalin (0.11 mol formaldehyde) with cooling and mixing. The mixture stood overnight and was then refluxed for about 7½ hours. Evaporation of the solvent at diminished pressure left a gummy residue, (+)-6-methyl-9-(1-piperidylmethyl) - 10 - hydroxy - 1,2,3,3a,5,6,6a,7,11b,11c-decahydro-4H-dibenzo[de,g]quinoline. The base was dissolved in ether, washed twice with water, and dried over anhydrous sodium sulfate. The ether solution was filtered. Acidification of the ethereal filtrate with ethanolic-HBr (ca. 14%) gave a precipitate which melted at 240–244° (dec.). The product, (+)-6-methyl-9-(1-piperidylmethyl) - 10 - hydroxy - 1,2,3,3a,5,6,6a,7,11b,11c-decahydro-4H-dibenzo [de,g] quinoline dihydrobromide, was recrystallized from 225 cc. alcohol and 75 cc. isopropyl alcohol. The colorless crystalline powder melted at 252–254° (dec.); $[\alpha]_D^{23}=+68.8°$ (3%, water).

*Example 4*

257 g. (1 mol) of (+)-6-methyl-10-hydroxy-1,2,3,3a,5,6,6a,7,11b,11c - decahydro - 4H - dibenzo[de,g]quinoline were stirred in 2 liters of alcohol. 135 cc. (96 g. or 1.31 mols) of diethylamine were added over a 10–15 minute period. 105 g. of 37.4% formalin (39.2 g. or 1.31 mols formaldehyde) were then dropped in over a 20 minute period. The temperature of the mixture rose a few degrees, and cold water cooling was applied. After stirring for 3 hours, the reaction mass stood overnight, was heated slowly with stirring to form a homogeneous solution, and was then refluxed for 7 hours. Evaporation of the solvent at diminished pressure left a brown viscous oil as a residue, comprising (+)-6-methyl-9-diethylaminomethyl - 10 - hydroxy - 1,2,3,3a,5,6,6a,7,11b,11c-decahydro-4H-dibenzo[de,g]quinoline. The oil was dissolved in 0.5 liter ether and the ether solution was washed twice with 200 cc. portions of water and dried with anhydrous sodium sulfate. During the drying period, some unchanged starting base precipitated. The solution was filtered from the precipitate and the solvent was evaporated. The residual oily base was taken up in 700 cc. hot isopropanol, filtered, and stirred in an ice-water bath while adding 825 g. of a 20% solution of hydrogen bromide in alcohol (165 g. or 2.04 mols HBr) over a ½ hour period. After the addition, the clear solution was stirred several hours at 0–5°, and the precipitate, which slowly deposited, was filtered off, washed with 900 cc. cold isopropanol, and dried in vacuo over KOH flakes. The product, (+)-6-methyl-9-diethylaminomethyl - 10 - hydroxy - 1,2,3,3a,5,6,6a,7,11b,11c - decahydro-4H-dibenzo[de,g]quinoline dihydrobromide, was obtained as a colorless powder, M.P. 239–240°, $[\alpha]_D^{25}=+81.0°$, pH of 1.0% aqueous solution 5.1.

(+) - 6 - methyl - 9 - diethylaminomethyl - 10 - hydroxy - 1,2,3,3a,5,6,6a,7,11b,11c - decahydro - 4H - dibenzo[de,g]quinoline dihydrochloride was prepared by adding an excess of 4 N ethanolic-HCl to an ethereal solution of the free base, obtained by alkalizing an aqueous solution of the dihydrobromide with NH$_4$OH and extracting with ether. The compound is a colorless crystalline powder, M.P. 246–247° (dec.) (from isopropanol), $[\alpha]_D^{22}=+93.1°$, pH of 1% aqueous solution=4.55, pH of 3% aqueous solution=4.78.

The citrate, tartrate and phosphate salts were prepared from the base and the acid in the same manner as above. All were uncrystallizable gums.

To one mol of (+)-6-methyl-9-diethylaminomethyl-10 - hydroxy - 1,2,3,3a,5,6,6a,7,11b,11c - decahydro - 4H-dibenzo[de,g]quinoline were added 3 mols of methyl iodide in ether. The (+)-6-methyl-9-diethylaminomethyl - 10 - hydroxy - 1,2,3,3a,5,6,6a,7,11b,11c - decahydro-4H-dibenzo[de,g]quinoline methiodide was recrystallized from ethanol and obtained as off-white crystals, M.P. 252–254° (dec.); $[\alpha]_D^{24}=+77.8°$ (1%, 50% aqueous alcohol).

*Example 5*

To 340 g. (1.32 mols) of (+)-6-methyl-10-hydroxy-1,2,3,3a,5,6,6a,7,11b,11c - decahydro - 4H - dibenzo[de,g]quinoline, in 2 liters of alcohol, were added 126 g. (1.72 mols) of diethylamine over a 10 minute period. The temperature rose from 24° to 28°. 138 g. of 37.4% formalin (51.6 g. or 1.72 mols formaldehyde) were then added over a 35 minute period. Halfway through this addition the temperature had risen to 32°, and the reaction mass was cooled to 14° with cold water. Following the addition, the suspension was stirred vigorously for 10 minutes, the cooling bath was removed, and the mixture was heated slowly to reflux over a 3 hour period. The solution, now clear, was refluxed for 8 hours and stirred for 2 hours longer while cooling. The solvent was evaporated at diminished pressure, one liter of benzene was added to the residue, and the solution was evaporated once more to leave a residual viscous liquid. The residue was dissolved in 1.5 liters of warm isopropanol and filtered by suction. Dry HCl gas was passed through the clear, brown filtrate until acid to Congo red. The resultant, turbid solution was stirred and chilled several hours while (+) - 6 - methyl - 9 - diethylaminomethyl - 10-hydroxy - 1,2,3,3a,5,6,6a,7,11b,11c - decahydro - 4H - dibenzo[de,g]quinoline dihydrochloride slowly deposited. The product was filtered off, washed with cold isopropanol and dried in vacuo over potassium hydroxide flakes to obtain a colorless powder, M.P. 242–242.5° (dec.). Upon recrystallization from alcohol, the melting point was 246–247° (dec.).

*Example 6*

To 6 cc. (0.0583 mol) of diethylamine and 13 g. (.05 mol) of (—) - 6 - methyl - 10 - hydroxy - 1,2,3,3a,5,6,6a,7,11b,11c - decahydro - 4H - dibenzo[de,g]quinoline in 200 cc. of alcohol were added 5 g. (.0623 mol) of 37.4% formalin. The mixture was heated gently on the steam bath for 7 hours and the resultant clear, brown solution was evaporated at diminished pressure to give (—) - 6 - methyl - 9 - diethylaminomethyl - 10 - hydroxy-1,2,3,3a,5,6,6a,7,11b,11c - decahydro - 4H - dibenzo-[de,g]quinoline in the form of a viscous residue. The residue was dissolved in ether, filtered, and acidified with ethanolic HBr. The precipitated gum was taken up in about 350 cc. boiling isopropanol, and the chilled solution gradually deposited colorless crystalline (—)-6-methyl - 9 - diethylaminomethyl - 10 - hydroxy - 1,2,3,3a,5,6,6a,7,11b,11c-decahydro-4H-dibenzo[de,g]quinoline dihydrobromide, M.P. 233.5–234.5° (dec.); $[\alpha]_D^{25}=-74.5°$ (3%, water).

*Example 7*

To 15 g. (0.124 mol) of N-methylbenzylamine and 25.7 g. (0.1 mol) of (+)-6-methyl-10-hydroxy-1,2,3,3a,5,6,6a,7,11b,11c - decahyrdo - 4H - dibenzo[de,g]quinoline in about 300 cc. of alcohol were added 9 g. (0.11 mol) of 37.4% formalin. The mixture was refluxed for about 8 hours and the solvent was evaporated at diminished pressure to give (+)-6-methyl-9-(N-methylbenzylaminomethyl) - 10 - hydroxy - 1,2,3,3a,5,6,6a,7,11b,11c-decahydro-4H-dibenzo[de,g]quinoline in the form of a viscous residue. This residue was dissolved in ether, washed twice with water, and dried over anhydrous sodium sulfate. The solution was filtered and the filtrate was acidified with 21% ethanolic-HBr. A gum precipitated. The supernatant liquid was decanted, and the gum was washed with ether and taken up in 125 cc. boiling isopropanol. Deposition gradually took place on standing, first at room temperature, and then under refrigeration. A tan crystalline powder, M.P. 227–230.5° (dec.), was obtained. The product was recrystallized by dissolving in a boiling solution of 175 cc. ethanol and 35 cc. methanol, chilling, and diluting with ether. (+)-6-methyl - 9 - (N - methylbenzylaminomethyl) - 10 - hydroxy-1,2,3,3a,5,6,6a,7,11b,11c - decahydro - 4H - dibenzo[de,g]quinoline dihydrobromide was obtained as tan powdery crystals, M.P. 238–241° (dec.); $[\alpha]_D^{22}=+61.2°$ (3%, water).

*Example 8*

To 19 g. (0.11 mol) of phenyltrimethylammonium chloride suspended in 100 cc. of benzene was added a solution of 4.55 g. (0.11 mol) of 97% sodium hydroxide pellets in 10 cc. of water. The mixture was stirred and warmed slightly.

50 g. (0.1 mol) of (+) - 6 - methyl - 9 - diethylaminomethyl - 10 - hydroxy - 1,2,3,3a,5,6,6a,7,11b,11c - decahydro - 4H - dibenzo[de,g]quinoline dihydrobromide were dissolved in water and the solution was made alkaline with conc. ammonium hydroxide. The liberated free base, (+) - 6 - methyl - 9 - diethylaminomethyl - 10-hydroxy - 1,2,3,3a,5,6,6a,7,11b,11c - decahydro - 4H - dibenzo[de,g]quinoline, was extracted with toluene, and the toluene solution was dried over anhydrous sodium sulfate. This solution, after filtration, was added to the methylating mixture prepared above and refluxed for 4 hours utilizing a water separator. Water was then added to the reaction mixture and the organic layer was separated. The latter was washed twice with dil. sodium hydroxide solution, twice with water, and dried over anhydrous sodium sulfate. Evaporation of the solvent at diminished pressure left an oily residue, (+) - 6 - methyl-9 - diethylaminomethyl - 10 - methoxy - 1,2,3,3a,5,6,6a,-7,11b,11c - decahydro - 4H - dibenzo[de,g]quinoline, which was dissolved in 80 cc. of isopropanol and acidified with 162 g. (0.2 mol of HBr) of a 10% solution of HBr in ethanol. The resultant solution was evaporated and the solid residue was recrystallized from 550 cc. isopropanol. The product, (+) - 6 - methyl - 9 - diethylaminomethyl - 10 - methoxy - 1,2,3,3a,5,6,6a,7,11b,11c-decahydro - 4H - dibenzo[de,g]quinoline dihydrobromide, precipitated as a crystalline powder, M.P. 239–241° (dec.); $[\alpha]_D^{24}=+86.3°$ (3%, water).

*Example 9*

(+) - 6 - methyl - 9 - (1 - pyrrolidylmethyl) - 10 - hydroxy - 1,2,3,3a,5,6,6a,7,11b,11c - decahydro - 4H - dibenzo[de,g]quinoline was produced from 25.7 g. (+)-6 - methyl - 10 - hydroxy - 1,2,3,3a,5,6,6a,7,11b,11c - decahydro - 4H - dibenzo[de,g]quinoline, 7.8 g. pyrrolidine and 9 g. of 37.4% formalin according to the procedure described in Example 3. The hydrochloride was prepared from the free base with ethanolic-HCl, also by the procedure of Example 3, M.P. 192–194.5° (dec.); $[\alpha]_D^{24}=+93.6°$ (1%, water).

We claim:
1. A compound selected from the group consisting of bases represented by the structural formula

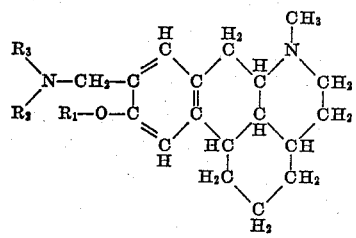

wherein $R_1$ represents a member of the group consisting of hydrogen and lower alkyl and $R_2$ and $R_3$ each represents a member of the group consisting of lower alkyl and phenyl lower alkyl individually, and oxypolymethylene and polymethylene jointly in a saturated 5 to 6 membered monocyclic nitrogen monoheterocyclic together with the nitrogen atom to which $R_2$ and $R_3$ are attached, and medicinally acceptable acid addition salts, lower alkyl quaternary and phenyl lower alkyl quaternary salts of said bases.

2. 6 - methyl - 9 - dimethylaminomethyl - 10 - hydroxy - 1,2,3,3a,5,6,6a,7,11b,11c - decahydro - 4H - dibenzo[de,g]quinoline.

3. 6 - methyl - 9 - dimethylaminomethyl - 10 - hydroxy-1,2,3,3a,5,6,6a,7,11b,11c - decahydro - 4H - dibenzo-[de,g]quinoline dihydrochloride.

4. 6 - methyl - 9 - (1 - piperidylmethyl) - 10 - hydroxy - 1,2,3,3a,5,6,6a,7,11b,11c - decahydro - 4H - dibenzo[de,g]quinoline.

5. 6 - methyl - 9 - diethylaminomethyl - 10 - hydroxy - 1,2,3,3a,5,6,6a,7,11b,11c - decahydro - 4H - dibenzo[de,g]quinoline.

6. 6 - methyl - 9 - diethylaminomethyl - 10 - hydroxy - 1,2,3,3a,5,6,6a,7,11b,11c - decahydro - 4H - dibenzo[de,g]quinoline dihydrochloride.

7. 6 - methyl - 9 - diethylaminomethyl - 10 - hydroxy - 1,2,3,3a,5,6,6a,7,11b,11c - decahydro - 4H - dibenzo[de,g]quinoline methiodide.

8. 6 - methyl - 9 - (N - methylbenzylaminomethyl)- 10 - hydroxy - 1,2,3,3a,5,6,6a,7,11b,11c - decahydro - 4H- dibenzo[de,g]quinoline.

9. 6 - methyl - 9 - diethylaminomethyl - 10 - methoxy- 1,2,3,3a,5,6,6a,7,11b,11c - decahydro - 4H - dibenzo[de,g]quinoline.

No references cited.